United States Patent
Chen

(10) Patent No.: US 9,767,319 B2
(45) Date of Patent: Sep. 19, 2017

(54) METHOD AND APPARATUS OF SECURE AUTHENTICATION FOR SYSTEM ON CHIP (SOC)

(75) Inventor: Xuemin (Sherman) Chen, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 2030 days.

(21) Appl. No.: 11/736,387

(22) Filed: Apr. 17, 2007

(65) Prior Publication Data

US 2008/0263362 A1    Oct. 23, 2008

(51) Int. Cl.
| | |
|---|---|
| H04L 29/06 | (2006.01) |
| G06F 21/73 | (2013.01) |
| G06F 21/31 | (2013.01) |
| G06F 21/44 | (2013.01) |
| G06F 21/71 | (2013.01) |

(Continued)

(52) U.S. Cl.
CPC .............. *G06F 21/73* (2013.01); *G06F 21/31* (2013.01); *G06F 21/44* (2013.01); *G06F 21/71* (2013.01); *G06F 21/72* (2013.01); *H04L 9/0825* (2013.01); *H04L 9/0866* (2013.01); *H04L 9/0869* (2013.01); *H04L 9/0877* (2013.01); *H04L 9/3226* (2013.01); *H04L 63/0838* (2013.01); *G06F 2221/2103* (2013.01); *G06F 2221/2129* (2013.01)

(58) Field of Classification Search
CPC ...................................................... G06F 21/62
USPC ......................................................... 713/168
See application file for complete search history.

(56) References Cited

U.S. PATENT DOCUMENTS

| | | |
|---|---|---|
| 7,003,674 B1 | 2/2006 | Hamlin |
| 7,212,806 B2 | 5/2007 | Karaoguz |

(Continued)

FOREIGN PATENT DOCUMENTS

| | | |
|---|---|---|
| CA | 2398323 A1 | 8/2000 |
| CN | 1427351 A | 7/2003 |

(Continued)

OTHER PUBLICATIONS

Nystrom, Brainard. "The SecurID SASL Mechanism." Jan. 1999. http://tools.ietf.org/html/draft-nystrom-securid-sasl-00. pp. 1-11.*

(Continued)

*Primary Examiner* — Jason K Gee
(74) *Attorney, Agent, or Firm* — Sterne, Kessler, Goldstein & Fox P.L.L.C.

(57) ABSTRACT

A SoC may be utilized to authenticate access to one or more secure functions. A password may be generated within the SoC which is unique to each SoC instance and unique to each iteration of authentication. The SoC may challenge external entities attempting access to provide a matching password. A random number sample may be generated within the SoC and stored. A chip ID, secret word and a table of keys with key indices are also stored in memory. Two or more of the stored items may be passed to a hash function to generate the password. The external entity may generate and return the password utilizing information communicated from the SoC during each authentication operation as well as information known a priori. The SoC may compare the returned password with the internally generated password and may grant access to the secure functions.

29 Claims, 6 Drawing Sheets

(51) Int. Cl.
  *G06F 21/72*    (2013.01)
  *H04L 9/08*    (2006.01)
  *H04L 9/32*    (2006.01)

(56) References Cited

U.S. PATENT DOCUMENTS

| | | | |
|---|---|---|---|
| 7,647,507 B1* | 1/2010 | Feng | G06F 21/10 380/277 |
| 7,669,760 B1 | 3/2010 | Zettner | |
| 8,887,307 B2 | 11/2014 | Chen | |
| 2002/0137524 A1 | 9/2002 | Bade et al. | |
| 2002/0154777 A1 | 10/2002 | Candelore | |
| 2003/0070067 A1 | 4/2003 | Saito | |
| 2003/0145203 A1* | 7/2003 | Audebert | G06Q 20/341 713/169 |
| 2003/0154355 A1* | 8/2003 | Fernandez | 711/163 |
| 2003/0163787 A1* | 8/2003 | Hay et al. | 715/522 |
| 2004/0066278 A1* | 4/2004 | Hughes | G06F 21/31 340/10.1 |
| 2004/0158708 A1* | 8/2004 | Peyravian et al. | 713/156 |
| 2005/0071671 A1 | 3/2005 | Karaoguz | |
| 2005/0078652 A1 | 4/2005 | Rousseau | |
| 2005/0182948 A1* | 8/2005 | Ducharme | G06F 21/10 713/189 |
| 2005/0256992 A1 | 11/2005 | Chalpin et al. | |
| 2006/0107316 A1* | 5/2006 | Fiske | G06F 21/32 726/18 |
| 2007/0157023 A1 | 7/2007 | Kotzin | |
| 2007/0162759 A1 | 7/2007 | Buskey et al. | |
| 2007/0209072 A1* | 9/2007 | Chen | 726/16 |
| 2009/0019530 A1 | 1/2009 | Keeler et al. | |
| 2009/0031409 A1 | 1/2009 | Murray | |

FOREIGN PATENT DOCUMENTS

| | | |
|---|---|---|
| CN | 1444835 A | 9/2003 |
| CN | 1889434 | 1/2007 |
| EP | 1 507 357 A1 | 2/2005 |
| JP | 2004-172865 A | 6/2004 |
| KR | 200468472 | 7/2004 |
| KR | 10-2005-0046520 A | 5/2005 |
| KR | 10-2006-0066621 A | 6/2006 |
| TW | 200410575 | 3/2008 |
| WO | WO9804967 | 2/1998 |
| WO | WO 00/048060 A1 | 8/2000 |
| WO | WO 2007/024170 A1 | 3/2007 |

OTHER PUBLICATIONS

A. Menezes, P. van Oorschot, and S. Vanstone, "Chapter 10, Identification and Entity Authentication" from Handbook of Applied Cryptography, CRC Press, 1996, Oct. 1, 1996, CRC Press Series on Discrete Mathematices and Its Applications, CRC Press Series on Discrete Mathematics and Its Applications, Boca Raton, FL, US, pp. 385-424, XP001525010, ISBN: 978-0-8493-8523-0, URL:http://www.cacr.math.uwaterloo.ca/hac.
EPO Communication dated Aug. 1, 2011 in Application No. 08005228.5-1245 / 1983466 (6 pages).
Extended European Search Report for EP Application No. EP 08 01 7660, The Hague, Netherlands, mailed on Mar. 23, 2012; 6 pages.
Philips Semiconductors' Data Sheet—mifare Standard Card IC MF1 IC S50 Functional Specification, Product Specification Revision 5.1, 19 pages, May 2001.
English-language Abstract of Chinese Patent Application Publication No. 1427351 A, published Jul. 2, 2003, 1 page.
English-language Abstract of Chinese Patent Application Publication No. 1444835 A, published Sep. 24, 2003, 2 pages.
English-language Abstract of Japanese Patent Application Publication No. 2004-172865 A, published Jun. 17, 2004, 2 pages.
English-language Abstract of Korean Patent Application Publication No. 10-2005-0046520 A, published May 18, 2005, 2 pages.
English-language Abstract of Korean Patent Application Publication No. 10-2006-0066621 A, published Jun. 16, 2006, 2 pages.
English-language Abstract of Taiwan Patent Application Publication No. 200410575, published Jun. 16, 2004, 1 page.
Office Action for Taiwan Patent Application No. 97113832, filed Apr. 16, 1997, 7 pages, mailed Dec. 24, 2012.
European Office Action directed toward related EP Application No. 08 005 228.5-1853, dated Jul. 13, 2017 from the European Patent Office, Rijswijk, Netherlands; 5 pages.

* cited by examiner

METHOD AND APPARATUS OF SECURE AUTHENTICATION FOR SYSTEM ON CHIP (SOC)

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to secure communication systems. More specifically, certain embodiments of the invention relate to a method and apparatus of secure authentication for a System-on-Chip (SoC).

BACKGROUND OF THE INVENTION

Industry standards provide the necessary protocols and infrastructure that may be used for delivering digital television or DVD content with audio, video and data signals. These streams may be processed by various functions and operations within broadband networks, head-end and terminal devices such as set-top boxes (STB), and media devices such as DVD. These various functions and operations may for example involve access to sensitive areas of the device such as scan access, system buses and system interfaces and may benefit from some form of security or user authentication mechanism.

Passwords are the most popular authentication mechanism. They make use of knowledge a user has. The user supplies a password and a security system validates it. If the password is verified to be associated with a user, the user's identity is authenticated. If not, the password is rejected and authentication fails.

Passwords have the fundamental problem that they are reused on multiple devices. If an unauthorized user discovers a password on one device, it may be used to gain access to another device that authenticates with the same password. In this case, a device such as an STB cannot distinguish between the unauthorized user and a legitimate user.

For many applications, such as a secure download operation, a password may be discovered by an unauthorized user during an operation and may then be utilized for gaining access during subsequent operations of the same type.

In order to ensure secure communication, transmitted streams may need to be protected during transmission to devices such as STB. Upon receipt of the transmitted steams, one or more devices within the STB may need to provide secure access for the streams.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

An apparatus and/or method of secure authentication for a system on a chip (SoC), substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and apparatus of secure authentication for system on a chip (SoC). Aspects of the invention may comprise a SoC that may enable authentication of an external entity attempting to gain access to a function or system. The SoC and an authorized external entity may each have knowledge of hidden data prior to an authentication attempt and may communicate data during the authentication process as well. Using like data, the SoC and external entity may be able to generate the same password and achieve system access. Passwords may be unique in two ways, for example: per operation and per SoC device. A random number generator (RNG) on board the SoC may enable the passwords to vary for each iteration of the authentication process. Each instance of a SoC has its own secret word allowing passwords to be unique for each device.

Figure 1A:
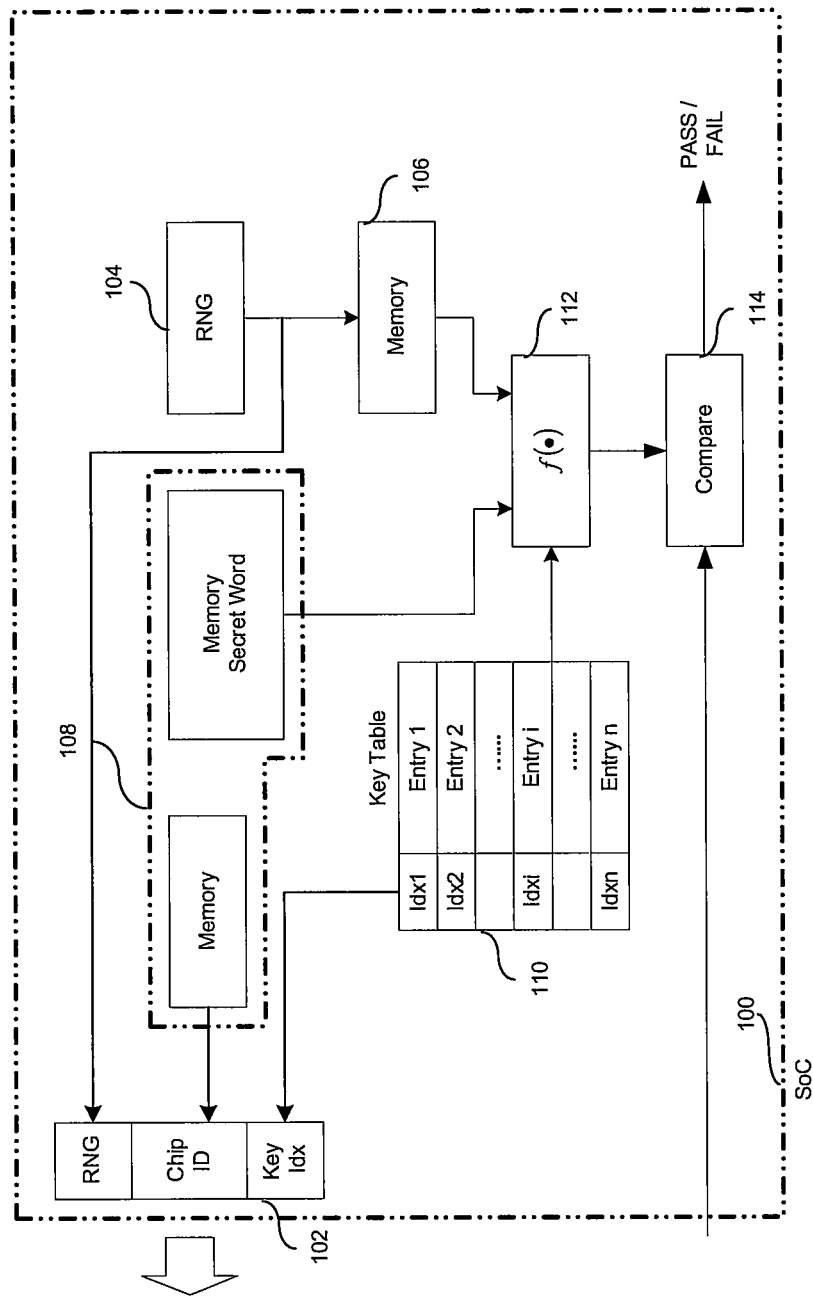
FIG. 1A is a block diagram that illustrates an exemplary system on a chip (SoC) with internal re-writable memory and that enables password authentication, in accordance with an embodiment of the invention.

FIG. 1A is a block diagram that illustrates an exemplary SoC that enables secure authentication operations in accordance with an embodiment of the invention. Referring to FIG. 1A, there is shown an SoC 100 that may comprise a challenge register 102, a random number generator (RNG) 104, a plurality of local memory units 108, 110, local re-writable memory 106, an encryption unit 112 and a digital comparator unit 114. The boundary of the SoC 100 is shown.

The challenge register 102 may comprise suitable storage for a random number sample generated by the RNG 104, chip ID and a key table index. The challenge register 102 comprises suitable circuitry, logic and/or codes and may be adapted to exchange information between the SoC and an external entity FIG. 2 (200), requesting authentication. The challenge register 102 is communicatively coupled to the RNG 104 and to memories 108 and 110.

The RNG 104 may be communicatively coupled to the challenge register 102 and local re-writable memory 106. The RNG 104 comprises suitable circuitry, logic and/or code and may be adapted to generate the random number sample.

The memory 108 may comprise storage for the chip ID and the secret word. The memory 108 may enable secure storage of the secret word. The secret word may be generated utilizing the chip ID and a secure secret algorithm. The secure storage within 108 may be communicatively coupled to the encryption unit 112 and decoupled from the any external entity. The memory 108 may be enabled to store the chip ID and may be communicatively coupled to the challenge register 102. The memory 108 may utilize any type of storage technology such as PROM, Flash or EEPROM.

The local re-writable memory 106 may comprise storage for output from the random number generator 104. The local re-writable memory 106 may utilize any type of storage technology, such as Flash or EEPROM. The memory local re-writable 106 may be communicatively coupled to the RNG 104 and the encryption unit 112.

The memory 110 may comprise suitable logic, circuitry, and/or code that may enable storage of the key table and associated key indices. The memory 110 may be utilized for communicating data to the encryption unit 112 as well as the challenge register 102.

The encryption unit 112 may comprise suitable logic, circuitry, and/or code that may enable the generation of a password from a plurality of input data. In one aspect of the invention, the encryption unit 112 may be enabled to encrypt data from a plurality of sources: the secret word from 108, the random number sample from 106 and a key from the key table within memory 110, to generate the password. In another embodiment of the invention, the encryption unit 112 may comprise suitable logic, circuitry, and/or code to enable use of a hash function such as SHA1, SHA2 and HMAC-SHA. In this regard, data from two sources may be utilized to generate the password: the secret word from memory 108 and the random number sample from local re-writable memory 106.

The digital comparator 114 may comprise suitable logic, circuitry, and/or code that may be adapted to receive the password from an external entity and the password generated by the encryption unit 112. The digital comparator 114 may comprise suitable logic, circuitry, and/or code that may be adapted to compare two passwords and output an authentication pass or fail indication.

In operation, the random number sample may be generated within RNG 104. The random number sample generated by the RNG 104, chip ID from memory 108 and key index from memory 110 may be communicated to the challenge register 102. Then the contents of the challenge register 102 may be sent to the external entity 200 shown in FIG. 2, in a challenge message so that the external entity may generate the password and return it in a challenge response. The random number sample generated in the RNG 104 may be stored in local re-writable memory 106. The secret word from 108, random number sample from 106 and the key at location key index in 110 may be communicated to the encryption unit 112. The encryption unit 112 may utilize a hash function to generate the password. The digital comparator 114 may receive the password from encryption unit 112 and the password from the external entity 200 and compare them. The SoC 100 may determine whether the authentication has passed or failed.

Figure 1B:
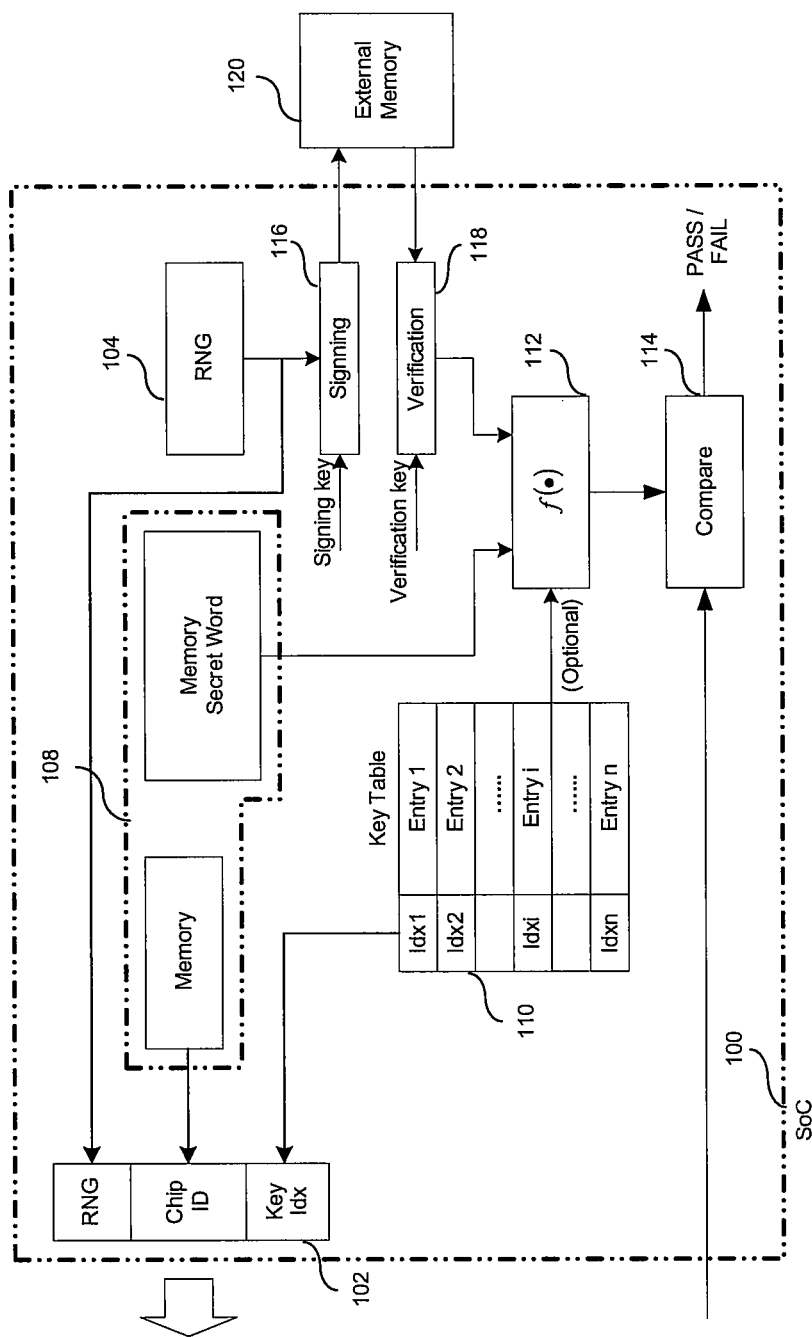
FIG. 1B is a block diagram that illustrates an exemplary SoC with external re-writable memory, which enables a password authentication process, in accordance with an embodiment of the invention.

FIG. 1B is a block diagram that illustrates an exemplary system on a chip that enables secure authentication operations in accordance with an embodiment of the invention. Referring to FIG. 1B, there is shown the SoC 100 that may comprise the challenge register 102, the RNG 104, the plurality of local memory 108, 110, an external memory 120, the encryption unit 112, the digital comparator unit 114, a signing unit 116 and a verification unit 118. The SoC 100 as well as the challenge register 102, the RNG 104, the plurality of local memory 108, 110, the encryption unit 112 and the comparator unit 114 may be described similarly to and respectively with FIG. 1A the SoC 100, the challenge register 102, the RNG 104, the plurality of local memory 108, 110, the encryption unit 112 and the comparator unit 114. Referring to FIG. 1B, there is shown additional components that may comprise external memory 120, a signing unit 116 and a verification unit 118.

The signing unit 116 may comprise suitable logic, circuitry, and/or code that may be adapted to sign the random number sample output from the RNG 104. The signing unit 116 may sign the random number sample utilizing an asymmetric algorithm such as RSA, DSA or a symmetric algorithm such as HMAC using an embedded signing key. The signing unit 116 may comprise suitable logic, circuitry, and/or code that may be adapted to exchange information with an external memory 120 for storage of a signed random number sample. In another aspect of the invention, the signing key may be encrypted and stored on the external memory 120.

The external memory 120 may comprise a storage device, which may comprise suitable logic, circuitry, and/or code that may be adapted to exchange data with the SoC. The external memory 120 may comprise storage for output from the random number generator 104 which may have been signed in unit 116. The external memory 120 may be based, for example, on Flash storage technology. In one aspect of the invention, the signing and verification keys may be stored in external memory 120

The verification unit 118 may comprise suitable logic, circuitry, and/or code that may be adapted to receiving a verification key and the signed random number sample from external memory 120 and may decipher the signed random number sample. The verification unit 118 may comprise suitable logic, circuitry, and/or code that may be adapted to exchange information with the encryption unit 112.

In operation, the random number sample may be generated within RNG 104. The random number sample from the RNG 104, chip ID from memory 108 and key index from the memory 110 may be communicated to the challenge register 102. Then the contents of the challenge register 102 may be sent to the external entity 200 shown in FIG. 2 in a challenge message so that the external entity may generate the password and return it in a challenge response. The random number sample generated in the RNG 104 may be signed by the signing unit 116 and stored in external memory 120. The secret word from 108, the key at location key index in the memory 110 may be communicated to the encryption unit 112. The random number sample stored in external memory 120 may be returned to the SoC 100 more specifically to the verification unit 118 where it is may be and forwarded to the encryption unit 112. The encryption unit 112 may utilize a hash function to generate the password. The digital comparator 114 may receive the password from the encryption unit 112 and the password from the external entity 200 shown in FIG. 2 and compare them. The SoC determines if the authentication has passed or failed.

Figure 2:
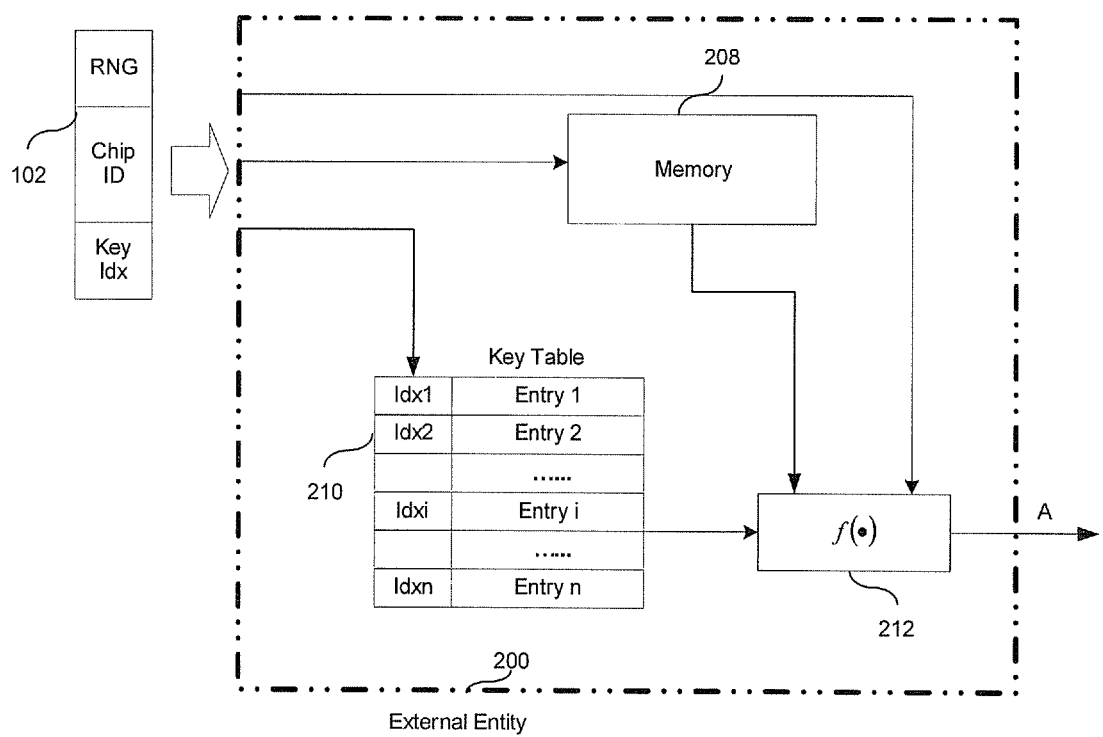
FIG. 2 is a block diagram that illustrates an exemplary entity external to the SoC, which enables generation of a password for the authentication process, in accordance with an embodiment of the invention.

FIG. 2 is a block diagram that illustrates an exemplary external entity 200, relative to SoC 100, which enables secure authentication operations in accordance with an embodiment of the invention. Referring to FIG. 2, there is shown the external entity 200 that may comprise a plurality of memory 208 and 210, and an encryption unit 212. The boundary of the external entity 200 is shown.

The memory 208 may comprise storage for the chip ID, and may comprise suitable logic, circuitry, and/or code that may be adapted to exchange data with the SoC 100 shown in FIGS. 1A and 1B. The memory 208 may comprise storage for the secret word. The memory 208 may be adapted to associate the received chip ID with the stored secret word. The secret word may be generated based on the chip ID and a secure secret algorithm. The memory 208 may be communicatively coupled to the encryption unit 212.

The memory 210 may comprise suitable logic, circuitry, and/or code that may enable storage of the table of keys and associated key indices. The memory 210 may be utilized for communicating data to the encryption unit 212.

The encryption unit 212 may comprise suitable logic, circuitry, and/or code that may enable the generation of a password from a plurality of input data. In one aspect of the invention, the encryption unit 212 may encrypt data from three sources: a secret word from 208, random number sample from the challenge register 102 on the SoC 100 in FIG. 1A and FIG. 1B, and a key from the memory 110, and then generate the password. In another embodiment of the invention, the encryption unit 212 may comprise suitable logic, circuitry, and/or code that may be enabled to utilize a hash function such as SHA1, SHA2 and HMAC-SHA. In this regard, data from two sources may be utilized to generate the password: the secret word from memory 208 and the random number sample from the challenge register 102 on the SoC 100 shown in FIG. 1A and FIG. 1B.

In operation, the random number sample, chip ID and key index may be retrieved from the challenge register 102. The chip ID may be stored in memory 208 and associated with the corresponding secret word. The secret word may have been generated based on the received chip ID or may have been stored prior to the authentication process. The key index from the challenge register 102 may be used to look-up the corresponding key in the memory 210. Then the secret word from the memory 208, the key from memory 210 and the random number sample from the challenge register 102 may be communicated to the encryption unit 212. The encryption unit 212 may utilize a hash function to generate the password. The password may be sent to the SoC 100 shown in FIG. 1A and FIG. 1B in the challenge response.

Figure 3A:
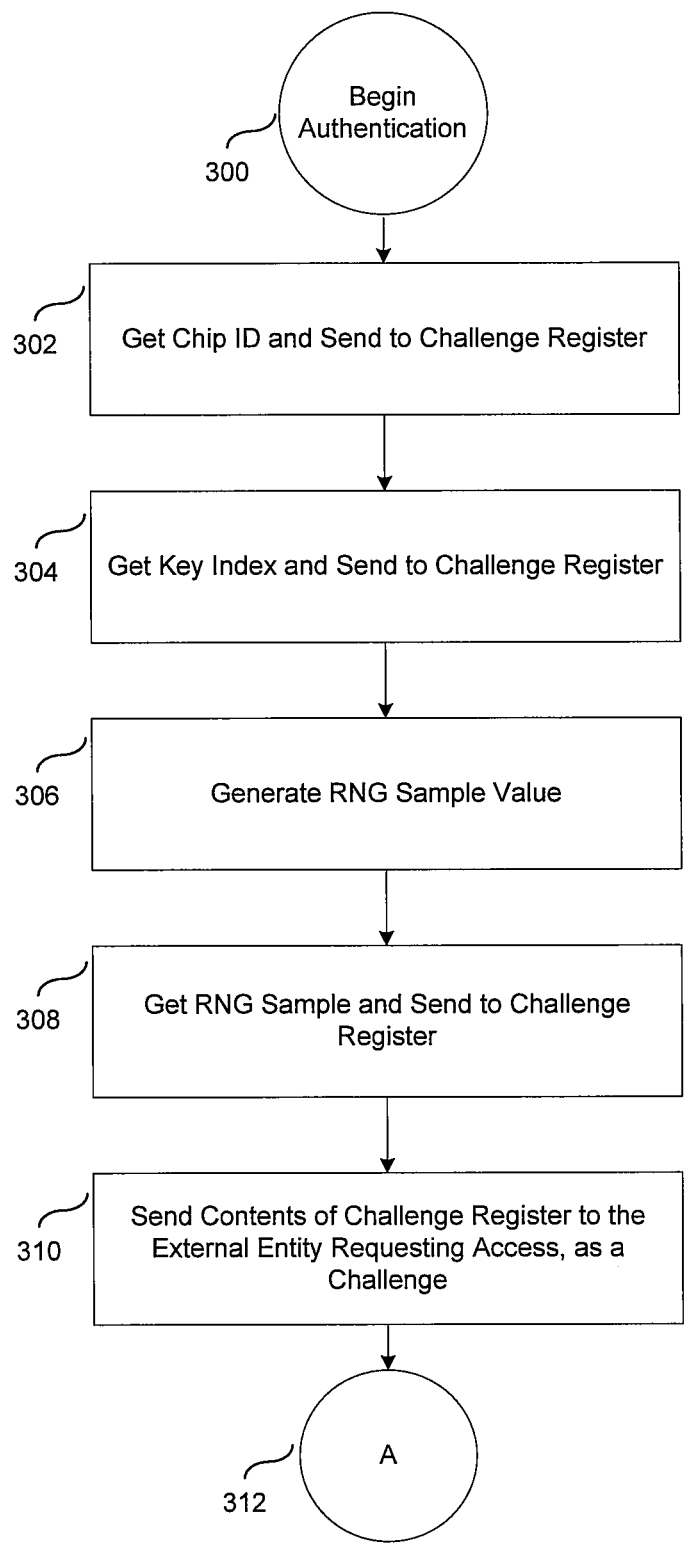
FIG. 3A is a flow chart that illustrates an exemplary portion of the authentication process within the SoC, in accordance with an embodiment of the invention.

Referring to FIG. 3A, there is shown a flow chart wherein step 300 refers to the beginning of an authentication operation on the SoC 100 shown in FIG. 1A and FIG. 1B. In step 302, the chip ID from memory 108 is sent to the challenge register 102. In step 304, a key index from memory 110 is sent to the challenge register 102. In step 306 the random number generator (RNG) 104 generates the random number sample. In step 308, the random number sample may be sent to the challenge register 102. In step 310 the contents of the challenge register 102 are sent from the SoC 100 to the external entity 200 shown in FIG. 2. Step 312 directs continuation of flow chart to FIG. 3B and FIG. 3C.

Figure 3B:
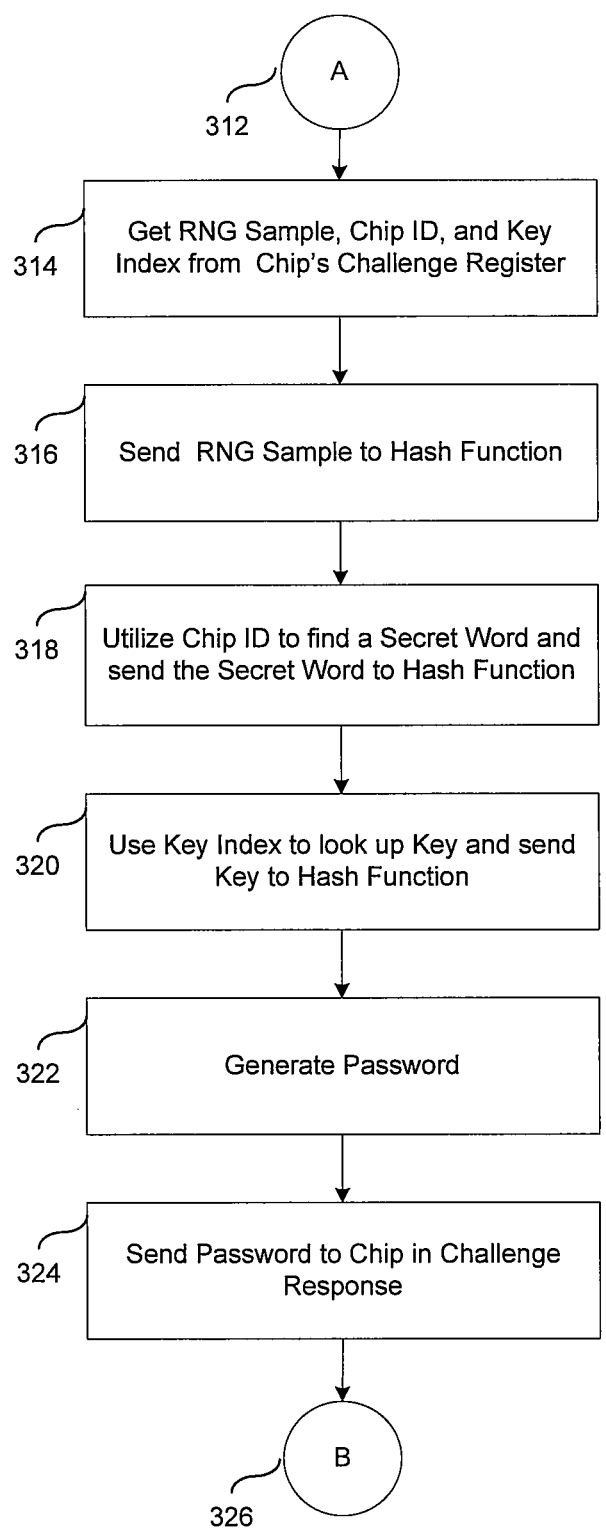
FIG. 3B is a flow chart that illustrates an exemplary portion of the authentication process within an exemplary entity external to the SoC, in accordance with an embodiment of the invention.

FIG. 3B is a flow chart that illustrates an exemplary portion of the authentication process within an exemplary entity external to the SoC, in accordance with an embodiment of the invention. Referring to FIG. 3B, there is shown a flow chart wherein step 312 is a continuation directive from FIG. 3A. In step 314, the random number sample, chip ID and key index are received by the external entity 200 shown in FIG. 2 from the challenge register 102 on the SoC 100. In step 316, the random number sample may be sent to a hash function within encryption unit 212. In step 318, the chip ID received from the challenge register 102 may be used to generate or look-up the secret word. The secret word in memory 208 may then be sent to the hash function within the encryption entity 212. In step 320 the key index received from challenge register 102 may be utilized to look-up the key in the table of keys. The key may be sent to the hash function within the encryption unit 212. In step 322, the password is generated by the encryption unit 212. In step 324, the password may be sent from the external entity 200 to the SoC 100 in a challenge response. Step 326 is a flow chart continuation directive to FIG. 3C.

Figure 3C:
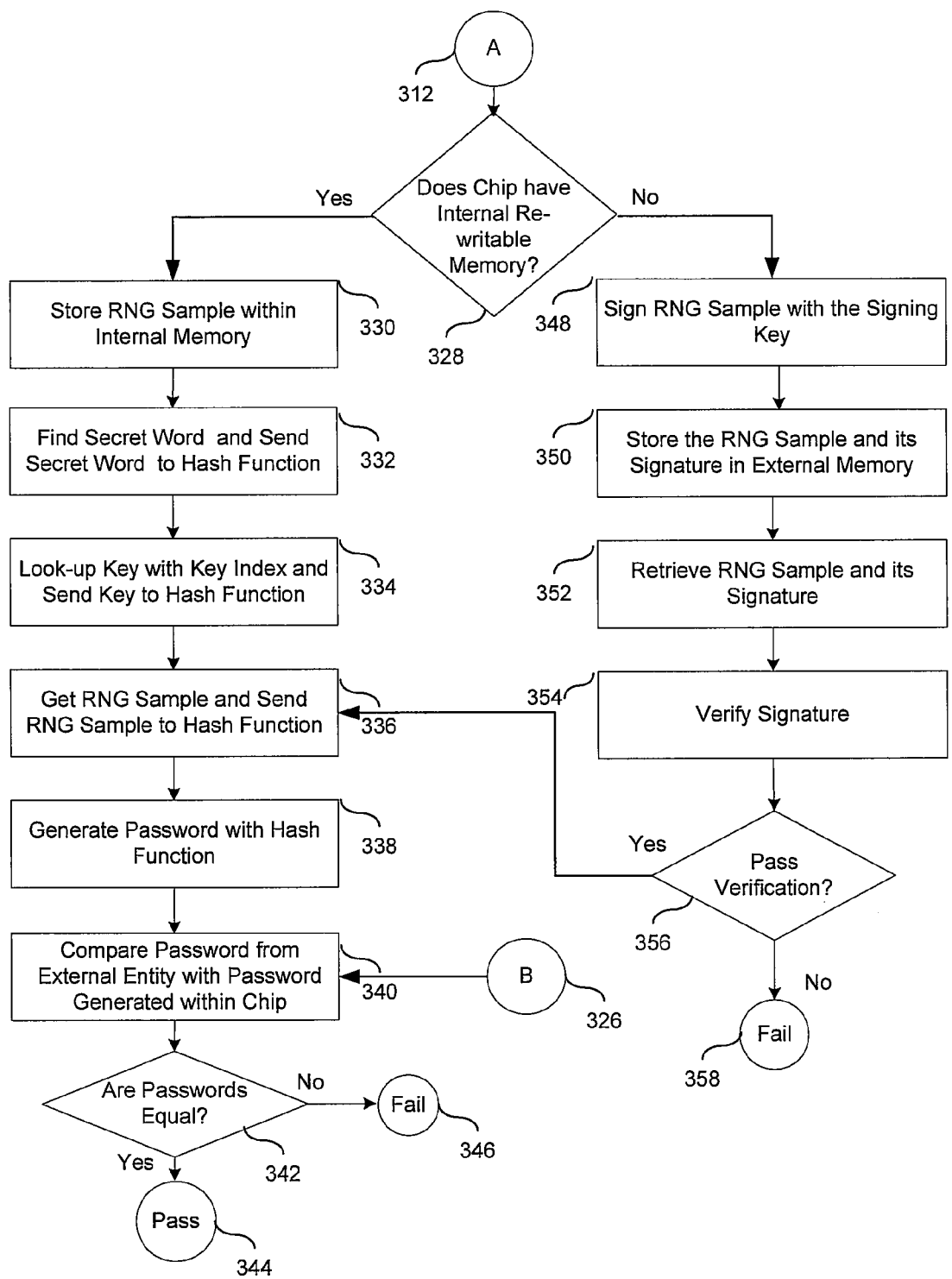
FIG. 3C is a flow chart that illustrates an exemplary portion of the authentication process within the SoC, in accordance with an embodiment of the invention.

FIG. 3C is a flow chart that illustrates an exemplary portion of the authentication process within the SoC, in accordance with an embodiment of the invention. Referring to FIG. 3C, there is shown a flow chart wherein step 312 is a continuation directive from FIG. 3A. In step 328, when the chip has internal re-writable memory as in FIG. 1A, the process may proceed to step 330. In step 330, the random number sample from RNG 104 may be stored in local re-writable memory 106. In step 332, the secret word from the memory 108, is sent to the hash function in the encryption unit 112. In step 334, the key index is used to look up the key in memory 110 and sent to encryption unit 112. In step 336, the random number sample stored in internal re-writable memory 106 may be sent to the hash function in encryption unit 112. In step 338, the password may be generated from the hash function in encryption unit 112. In step 340, the SoC 100 password from encryption unit 112 and the password from external entity 200 shown in FIG. 2, are received by the digital comparator 114. In step 342, when the passwords are equal, the process may proceed to step 344, and pass in the end step. In step 342, when the passwords are not equal, the process may continue to step 346 and fail the end step.

In step 328, when the SoC 100 does not have internal re-writable memory, the process may proceed to step 348. In step 348, the random number sample from the RNG 104 is signed in the signing unit 116. In step 350, the random number sample and its signature are stored in the external re-writable memory 120. In step 352, the random number sample and its signature are returned to the SoC 100 and verified in the verification unit 118. In step 356, when the random number sample and the signature do not pass verification in verification unit 118, the process may proceed to step 358 and fail the end step. In step 356, when the random number sample and the signature pass verification in verification unit 118, the process may proceed to step 336.

The system illustrated in FIG. 1A, FIG. 1B and FIG. 2, enables authenticating of access to one or more secure functions. Authentication may be controlled by the SoC 100 shown in FIG. 1A and FIG. 1B and may utilize a password that is unique in two ways: for each SoC performing authentication and for each iteration of the authentication process.

The authentication method may comprise generating said password within the SoC 100 as well as within the external entity 200 shown in FIG. 2. The authentication process may begin by generating a random number sample within the SoC 100 random number generator (RNG) 104. The random number sample may be stored in either the on-chip memory 106 referring to FIG. 1A or, the off-chip memory 120 referring to FIG. 1B. The secret word may be stored in memory 108 and may be inaccessible to an external entity attempting access. At least one of the following: the chip ID that is unique to the SoC 100 may be stored in memory 108 and a table of keys, wherein said table of keys comprises a key and a corresponding key index that may be stored in the memory 110.

Two or more of the following: the secret word from unit 108, the random number sample from the memory 106 referring to FIG. 1A or from the memory 120 referring to FIG. 1B, and a key from said table of keys within the memory 110 may be passed to a hash function in encryption unit 112. The hash function may generate the password. A challenge may come from the SoC 100 shown in FIGS. 1A and 1B, to the external entity 200 shown in FIG. 2, to generate and return the password. At least two of the following: the random number sample, the chip ID which is unique to the SoC 100 and the key index may be stored in the challenge register 102 and then communicated to the external entity 200. An authorized external entity may have prior knowledge of the chip ID, the secret word, the table of keys with corresponding key indices and the hash function. The authorized external entity may be able to generate the secret word from the received chip ID and a secure secret algorithm. When the password is returned from external entity 200, the returned password may be compared with the password generated within the encryption unit 112 in the digital comparator 114. If the passwords match, access may be granted to the one or more secure functions.

Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for authenticating a device in a communication system, the method comprising:
   generating a password on a chip based on first information that is unique to said chip, second information that is unique to an authentication challenge, and third information, said first information including a chip identification (ID) of said chip, said second information being unique to said authentication challenge and changing between authentication challenges, and said third information being a key index corresponding to a key from a table of keys;
   sending said authentication challenge to an off chip device, wherein said authentication challenge includes said first information, said second information, and said third information to enable said off chip device to regenerate said password at said off chip device; and
   authenticating on said chip access to one or more secure functions controlled by said chip based on a comparison of said regenerated password from said off chip device in response to said authentication challenge and said password generated by said chip.

2. The method according to claim 1, wherein said password is unique to said chip and is unique to said authentication challenge.

3. The method according to claim 2, further comprising:
   generating within said chip, a random number sample from a random number generator (RNG), said second information including said random number sample.

4. The method according to claim 3, further comprising:
   storing said random number sample in an on chip memory within said chip or an off chip memory within said off chip device.

5. The method according to claim 4, further comprising:
   storing a secret word within said chip, wherein said first information is based on said secret word, said secret word being inaccessible by said off chip device.

6. The method according to claim 5, further comprising:
   storing within said chip, one or more of: said first information, said second information and said third information.

7. The method according to claim 6, further comprising:
   passing two or more of: said secret word, said random number sample, and said key to a hash function; and
   wherein said generating comprises:
   generating, within said chip, said password from said hash function.

8. The method according to claim 1, wherein said authentication challenge challenges said off chip device to respond with said regenerated password that matches said password.

9. The method according to claim 7, wherein said storing comprises:
storing, in a register within said chip, two or more of: said first information, said second information, and said third information.

10. The method according to claim 9, wherein said authentication challenge includes contents of said register.

11. The method according to claim 10, wherein said off chip device has knowledge of said first information, said second information, said third information, and said hash function.

12. The method according to claim 11, wherein said authenticating comprises:
comparing said regenerated password from said off chip device with said password generated from said hash function.

13. The method according to claim 12, further comprising:
granting said access to said one or more secure functions based on said comparison.

14. The method according to claim 1, further comprising:
generating within said chip, a secret word utilizing a secure secret algorithm, wherein said first information is based on said secret word.

15. A system for authenticating a device in a communication system, the system comprising:
one or more circuits in a chip, said one or more circuits being configured to:
generate a password on a chip based on first information that is unique to said chip, second information that is unique to an authentication challenge, and third information, said first information including a chip identification (ID) of said chip, said second information being unique to said authentication challenge and changing between authentication challenges, and said third information being a key index corresponding to a key from a table of keys;
send said authentication challenge to an off chip device, wherein said authentication challenge includes said first information, said second information, and said third information to enable said off chip device to regenerate said password at said off chip device; and
authenticate on said chip access to one or more secure functions controlled by said chip based on a comparison of said regenerated password received from said off chip device in response to said authentication challenge and said password generated by said chip.

16. The system according to claim 15, wherein said password is unique to said chip and is unique to said authentication challenge.

17. The system according to claim 16, wherein said one or more circuits are further configured to generate a random number sample within said chip, said second information including said random number sample.

18. The system according to claim 17, wherein said one or more circuits are further configured to store said random number sample in an on chip memory within said chip or an off chip memory within said off chip device.

19. The system according to claim 18, wherein said one or more circuits are configured to store a secret word, wherein said first information is based on said secret word, said secret word being inaccessible by said off chip device.

20. The system according to claim 19, wherein said one or more circuits are configured to store one or more of said first information, said second information, and said third information.

21. The system according to claim 20, wherein said one or more circuits are further configured to pass two or more of said secret word, said random number sample, and said key from said table of keys to a hash function.

22. The system according to claim 21, wherein said one or more circuits is configured to generate said password from said hash function.

23. The system according to claim 15, wherein said authentication challenge challenges said off chip device to respond with said regenerated password that matches said password.

24. The system according to claim 21, wherein said one or more circuits comprise a register configured to store two or more of: said first information, said second information and said third information.

25. The system according to claim 24, wherein said authentication challenge includes contents of said register.

26. The system according to claim 25, wherein said off chip device has knowledge of said first information, said second information, said third information, and said hash function.

27. The system according to claim 26, wherein said one or more circuits is configured to compare said generated password from said off chip device with said password generated from said hash function.

28. The system according to claim 27, wherein said one or more circuits are configured to grant access to said one or more secure functions based on said comparison.

29. The system according to claim 15, wherein said one or more circuits are configured to generate, within said chip, a secret word utilizing a secure secret algorithm, wherein said first information is based on said secret word.

* * * * *